Oct. 6, 1959

J. P. ECKERT, JR 2,907,893

DELAY FLOP

Filed Sept. 24, 1954

2 Sheets-Sheet 1

INVENTOR

JOHN PRESPER ECKERT, JR.

BY E. Jerry Light

ATTORNEY

Oct. 6, 1959

J. P. ECKERT, JR

DELAY FLOP 2,907,893

Filed Sept. 24, 1954

2 Sheets-Sheet 2

INVENTOR

JOHN PRESPER ECKERT, JR.

BY E. Jerry Light

ATTORNEY

United States Patent Office 2,907,893

Patented Oct. 6, 1959

2,907,893

DELAY FLOP

John Presper Eckert, Jr., Philadelphia, Pa., assignor to Sperry Rand Corporation, a corporation of Delaware Application September 24, 1954, Serial No. 458,086

12 Claims. (Cl. 307—88)

This invention relates to that class of monostable devices termed delay flops and more particularly to non-resettable delay flops, although it is not limited to the latter. It is desirable in a computer circuit to employ a delay flop for purposes that are well known in the art. In the past, delay flops have employed vacuum tubes or other similar devices which have had certain disadvantages that are overcome by the present invention. Moreover, in connection with computing systems employing magnetic amplifiers throughout, it is desirable to have a delay flop which is compatible with the remainder of the system. Similar subject matter is included in the copending application of Henry William Kaufman, Ser. No. 453,981, now Patent 2,812,448.

A resettable delay flop is one in which the device will produce a continuous pulse or a series of pulses for a predetermined time following an input signal and in event another input signal arrives before the aforesaid predetermined time is up, the output signal is extended so that it continues for the aforesaid predetermined time following the last input signal. A non-resettable delay flop is one in which the predetermined time is measured only from the termination of the first input signal, and subsequent input signals occurring prior to the termination of the predetermined time do not extend that time or do not extend that time by the said predetermined time after the last signal.

It is a primary object of the invention to provide a delay flop designed to act as a component part in a computer system having magnetic amplifiers.

Another object of the invention is to provide a delay flop which has the requisite high level reliability in operation for computer circuits and does not use vacuum tubes or other components likely to burn out.

An additional object of the invention is to provide a delay flop that is low in cost, effective in operation and of long life.

Still another object of the invention is to provide a delay flop of small physical size as compared with the delay flops of the prior art.

An additional object of the invention is to provide a delay flop which is non-resettable but will respond to a new input pulse even though that pulse occurs immediately after the termination of an output pulse.

It is a further object of the invention to provide a delay flop employing magnetic amplifiers in which the delay element, usually a condenser, is returned to its original state immediately following the end of the period of the delay. In the case of a delay flop employing a condenser as the delay element, this object of the invention means that the condenser is discharged immediately upon acquiring its full charge.

In carrying out the aforesaid objects of the invention, I provide in combination, a complementing magnetic amplifier which produces an output signal only in the absence of an input signal, and a non-complementing magnetic amplifier which produces an output signal only in response to an input signal. The complementing magnetic amplifier emits a series of pulses when the device is first turned on and charges a condenser. As soon as the condenser is charged, its potential overcomes that of a fixed source such as a battery, and applies an input signal to the non-complementing magnetic amplifier, thus producing an output from the latter. The non-complementing magnetic amplifier has a feedback circuit containing delay means connecting its output to its input so that it will continuously recycle until some other event happens to interrupt the feedback and prevent an effective input signal to the non-complementing magnetic amplifier. The "set input" signal to the delay flop is arranged to stop the recycling of the non-complementing amplifier. When the output from the non-complementing amplifier ceases, the complementing amplifier which is driven from the output of the non-complementing amplifier begins to produce outputs which charge the condenser step-by-step, and when the condenser is fully charged it triggers the non-complementing magnetic amplifier so that the latter produces an output pulse. This output pulse operates a pulse transformer which is so connected to the condenser as to immediately (in a time not greater than the time between pulses) discharge it and reset the apparatus in a condition ready to receive another "set input" pulse. The output of the delay flop is connected to the output of the complementing magnetic amplifier and from the aforesaid description it will be noted that this amplifier produced a predetermined number of pulses prior to the time that the condenser was charged. Hence, in response to each "set input" pulse there will be a predetermined number of output pulses.

Figure 3:
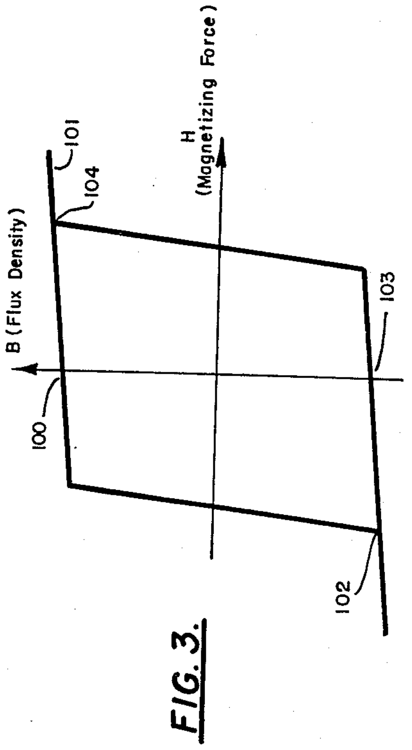
Figure 3 is a representative form of an idealized hysteresis loop for the material forming the core of the magnetic amplifiers.

In the drawing the apparatus enclosed in dotted line C is a complementing magnetic amplifier AC. It employs a magnetic core 10 which may be composed of a variety of materials, among which are the various types of ferrites and the various magnetic tapes, including Orthonik and 4–79 Moly-Permalloy. These materials may have different heat treatments to give them different properties. The magnetic material employed in the core should preferably, though not necessarily, have a substantially rectangular characteristic hysteresis loop somewhat as shown in Figure 3. Cores of this character are now well known in the art. In addition to the wide variety of materials available, the core may be constructed in a number of geometries including both closed and open paths; for example, cup-shaped, strips, and toroidal-shaped cores are possible. Those skilled in the art understand that when the core 10 is operating on the horizontal (or substantially saturated) portions of the hysteresis loop, the core is generally similar in operation to an air core in that the coil on the core is of low impedance. On the other hand, when a core is operating on the vertical (or unsaturated) portions of the hysteresis loop, the impedance of the coils on the core 10 will be high.

The operation of the complementing magnetic amplifier AC will now be described without reference to its cooperation with the remainder of the circuit of Figure 1. The source 16 of phase one power pulses, PP–1, generates a train of equally spaced square wave pulses as shown in Figure 2A. If it be assumed that at the beginning of any given pulse the core 10 has residual magnetism and flux density as represented by plus remanence point 100 in Figure 3, the next power pulse from the source 16 will drive the core from point 100 to plus saturation point 101. At the conclusion of the pulse the magnetization of the core will return to point 100. Successive pulses from the power source 16 will flow through rectifier 17, coil 18 and the output 19, repeatedly driving the core from plus remanence point 100 to plus saturation point 101. During the interval in which the core is being driven from point 100 to point 101, the core is operating on a relatively saturated portion of the hysteresis loop and the effective impedance of coil 18 is low. Hence, the power pulses will flow from source 16 to the output 19 without substantial impedance. If, however, during the interval between two power pulses, a pulse is received at the input 39, it will pass through coil 14, rectifier 11, resistor 21, source of power pulses 16, to ground. This current flow will magnetize the core negatively driving it from plus remanence point 100 to point 102. At the conclusion of this negative pulse, the core 10 will return to minus remanence point 103. The next power pulse from source 16 is just sufficient to drive the core 10 from point 103 to point 104. Since this operation takes place along a relatively unsaturated portion of the hysteresis loop, the coil 18 will have high effective impedance during this pulse and the current flow will be very low. At the conclusion of that pulse the magnetization will return to zero value, plus remanence point 100. If no signal appears on the input 39 immediately following the last-named power pulse, the next power pulse will drive the core to saturation at point 101 and will give a large output at 19. Consequently, it is clear that the complementing magnetic amplifier AC will feed large pulses at output 19 in the absence of any signal pulse on its input 39, and that immediately after the receipt of any pulse on the input 39 the next power pulse will be blocked and there will be no effective output at 19.

The operation of the non-complementing magnetic amplifier ANC will now be described considering it by itself, without reference to the remainder of the circuit. The phase two power pulses from source PP–2 are positive as in the previous case and have the waveform shown in Figure 2B. It is noted that the power pulses of source PP–2 are of opposite phase and occur during the spaces between the pulses of source PP–1. However, that is of no importance here during a consideration of the operation of the magnetic amplifier ANC per se. The positive power pulses from source PP–2 pass through rectifier 31, coil 32, resistor 37, thence through battery 34, to ground. If we assume that at the start of the first pulse the core was at point 103 on the hysteresis loop of Figure 3, it will be driven by this pulse to point 104. At the end of this pulse, it will return to positive remanence point 100 where the magnetizing force is zero. At the conclusion of the first pulse, current will flow in the following circuit: from ground through rectifier 36, coil 32, resistor 33, through battery 34, to ground. This is a current flow through coil 32 in the opposite direction from that of the first pulse and drives the core negatively from point 100 to point 102 on the hysteresis loop of Figure 3. At the conclusion of this reverse pulse, the core will move to negative remanence point 103 of zero magnetizing force. The second power pulse will again drive the core positively from point 103 to point 104, and thence it will go to point 100 after conclusion of the second pulse. The next action will be a flow of current in the following circuit: from ground, rectifier 36, coil 32, resistor 33, through battery 34, to ground. Hence the magnetization of the core will repeatedly traverse the hysteresis loop and a majority of the time the core will be operating on unsaturated portions of the hysteresis loop. Consequently, there will be no effective output. If, however, an input signal is received on wire 41 leading to coil 35 at a time when the core 30 is at point 100, the reverse current in the circuit, ground-36-32-33-34-ground, will not drive the core 30 negatively to point 102 as usual. In such situation there will be two opposite magnetizing forces on the core 30. On the one hand, there will be a flow of current in the circuit, ground to rectifier 36, coil 32, resistor 33, to the negative pole of battery 34, tending to apply a negative magnetizing force to the core 30. There will be an additional input current in coil 35 tending to apply a positive magnetizing force to the core 30. These two magnetizing forces will cancel each other and the core 30 will remain at positive remanence point 100 on the hysteresis loop. Consequently, the next power pulse will pass through rectifier 31, and coil 32 to the output 39. It will drive the core from point 100 to point 101 on the hysteresis loop. The core 30 is substantially saturated throughout this entire period, and therefore a large pulse output will appear at 39. The operation of non-complementing magnetic amplifier ANC may be summarized by stating that there will be currents in coil 32 that will drive the core around the hysteresis loop without substantial saturation and therefore without any substantial pulse output until there is a current flow through coil 35. This will stop the alternating magnetizations of the core, allowing the next power pulse to saturate the core and give a large output.

The operation of the circuit of Figure 1, taken as a whole, will now be described with reference to the waveform timing diagram of Figure 2. It is noted that the two sources of power pulses PP–1 and PP–2 generate spaced pulses with the pulses of one generator occurring during the spaces between pulses of the other generator. When the apparatus is first energized it may be assumed that no signal is received at "set input" terminal 50 for some considerable time, relatively speaking, whereby the apparatus is allowed to assume its operating condition. In the present device a preliminary period is required before the apparatus is ready to operate, this being somewhat analogous to the time required for a vacuum tube to warm up in the case of systems employing vacuum tubes. Consequently, the operation of the apparatus during this preliminary period will be described first. At first, the two power pulse generators PP–1 and PP–2 are generating pulses, but since there is no initial input on wire 41 leading to the signal input of non-complementing magnetic amplifier ANC, there is no initial output on wire 39 leading from that amplifier, as shown in Figure 2E. On the other hand, there will be outputs on the wire 19, Figure 2D, leading from the complementing magnetic amplifier AC. The reason for this is that a complementing magnetic amplifier emits a series or train of pulses so long as there is no signal at the input of the magnetic amplifier; all as heretofore explained. Consequently, there will appear at the output of complementing magnetic amplifier AC a series of pulses 80, 81, 82, 83 and 84, as shown in Figure 2D. These pulses flow through rectifier 51, resistor 52, and charge the condenser 53. As the condenser 53 charges, the potential on wire 40 increases in step-by-step fashion as shown between points 85 and 86 of Figure 2F. This potential, however, cannot influence the coil 35 of amplifier ANC until it builds up to a predetermined value. The explanation for this is that normally the potential on wire 40 will tend to cause a current to flow through rectifier 54, coil 35, rectifier 55, junction 57, resistor 60 and battery 56. However, this does not occur since the junction 57 is normally held at a positive potential by rectifier 58 and battery 59. Hence, no current will flow through the coil 35 until the positive potential on wire 40 is built up to a point in excess of positive potential at point 57 due to the battery 59 and the rectifier 58. The capacity of condenser 53, the resistance of resistor 52 and the potential of the source 16 may be selected so that any predetermined given number of pulses from source 16 is required to sufficiently charge the condenser 53 to a point where it will overcome the positive potential of point 57 and thus cause a reset current to flow through coil 35. In the waveform timing diagram of Figure 2D, it has been assumed that five pulses on wire 19 were required to charge the condenser sufficiently, so that the fifth of these pulses would produce a potential which would create a current flow in coil 35. When the fifth pulse 84 charges the condenser to the potential 86 and causes a current to flow through coil 35, a pulse 87 on wire 41, Figure 2G, resets the core 30 of the non-complementing magnetic amplifier ANC and thus causes this amplifier to produce an output pulse 88, Figure 2E. This output pulse 88 is fed back through wire 39, a delay line 61 and a rectifier 62 to the input 41 of the non-complementing magnetic amplifier ANC. The delay line 61 produces sufficient delay that the pulse appearing on wire 41 begins just as soon as the pulse 88 ends. This is shown by pulse 89 of Figure 2G. Since pulse 89 will reset the core 30 of the non-complementing magnetic amplifier ANC, the next power pulse from source PP–2 will flow through coil 32, which now has low effective impedance, to the output wire 39, thus producing pulse 90 of Figure 2E. Pulse 90 will be delayed by the delay line 61 and will therefore produce pulse 91, Figure 2G, in coil 35 which will reset the core and allow the next pulse from source PP–2 to flow to wire 39 and produce the pulse 92, Figure 2E. This action will repeat itself, whereby pulses 93, 94, 95, 96, 97 and 98 are produced, one after the other. That train of pulses represents the normal "off" condition of the apparatus and would continue indefinitely in the absence of a set input pulse at input terminal 50. Therefore, if we assume that a set input pulse 106, Figure 2C, is received at set input 50, it will raise the potential of junction point 57 to a high positive value and cancel the effect of the delayed pulse resulting from pulse 98. That is to say, in the absence of pulse 106, the pulse 98 would flow through the delay line 61 and thence through coil 35 in a direction toward the right. However, this flow of current is rendered impossible by the step input pulse 106 because the pulse 106 raises the potential of junction point 57 to a high positive value, thus preventing the smaller positive pulse 98 (which has been delayed by delay line 61) from flowing to point 57. Consequently, the non-complementing magnetic amplifier ANC produces no effective output during the time period immediately following pulse 106, in other words, pulses cease to occur on wire 39, as shown in Figure 2E. As explained previously, in the absence of a pulse on wire 39, that is the absence of a pulse at the input of complementing magnetic amplifier AC, that amplifier will produce a train of output pulses which are represented as pulses 107, 108, 109, 110 and 111 of Figure 2D. These pulses flow through rectifier 51, resistor 52, and charge the condenser 53 in step-by-step fashion over the period of time represented by reference numbers 112 to 113 in Figure 2F. Over substantially this entire period the potential on the condenser 53 is not built up to the point necessary to overcome the potential of battery 59, and consequently no current flows through the coil 35. However, when the charge on the condenser is built up to such a high level that the potential on wire 40 is greater than the potential of battery 59, current will flow through rectifier 54, coil 35, rectifier 55, junction 57, resistor 60, and battery 56. This flow of current is represented by pulse 114 of Figure 2G. It actuates the non-complementing magnetic amplifier ANC and causes the latter to produce an output pulse 115 of Figure 2E. This follows from the previous explanation wherein it was pointed out that in response to a flow of current through coil 35, the non-complementing magnetic amplifier ANC will allow the next pulse from source PP–2 to flow through coil 32 to its output lead 39. Since a pulse appears on wire 39, this pulse will be delayed in delay line 61 and thereafter feed through rectifier 62 to coil 35. Since the delay line 61 delays the pulse by one timed period, it will appear as pulse 116, Figure 2G, at the coil 35 which will again actuate the non-complementing magnetic amplifier ANC and allow the next pulse from source PP–2 to flow through coil 32 to the wire 39, see pulse 117 of Figure 2E. Pulse 117 will again be delayed by the delay line 61 and thereafter feed through coil 35 as pulse 118 of Figure 2G. The aforesaid operation will continue and therefore the apparatus taken as a whole will again be in its normal "off" position.

One interesting feature of the invention is the means for discharging the condenser 53 immediately after the period of delay is ended. Normally, the battery 66 places a positive potential on the cathode of rectifier 64 and thus prevents this rectifier from discharging the charge on the condenser 53. In other words, battery 66 has a potential greater than the maximum charge on the condenser 53, and as the battery 66 holds the cathode of rectifier 64 at a higher potential than the condenser 53 places on the anode of that rectifier, the rectifier 64 does not discharge any current from condenser 53. However, when pulse 115 occurred at the end of the delay period of the apparatus, that pulse passed a current through the primary 67 of the transformer 68, and induced in the secondary 65 a potential substantially equal to the potential of battery 66. Hence, the condenser 53 now has a direct and immediate discharge path through rectifier 64, coil 65, battery 66, to ground. Since the battery 66 and the secondary 65 have a substantially equal and opposite potential, these two elements are the equivalent of a short circuit from the cathode of rectifier 64 to ground. Resistor 73 and battery 74 normally draw from junction 72 a current slightly greater than that required to be passed through coil 14 of amplifier AC to revert its core to point 102 of Figure 3. When the pulses from PP–1 are negative, rectifier 70 will pass such current through resistors 21 and 73 as may be required to maintain junction 72 approximately at ground potential, so that any signal applied to 39 and through the rectifier to coil 14 will find no opposing voltage. However, when power pulses from PP–1 are positive, current will flow through resistor 21, junction 72, resistor 73 and battery 74 to ground. Resistors 21 and 73 are so proportioned that under these conditions junction 72 will become positive with respect to ground by an amount equal to or greater than the voltage which will be induced in coil 14 by the movement of core 10 from points 103 to 104 of Figure 3 under the influence of the power pulse from PP–1 applied to coil 18. This insures that the end of coil 14 which is connected through the rectifier to lead 39 will not be below ground, and therefore will not draw an undesired and spurious current from 39 during the application of the positive power pulse to coil 18. If this "blocking" voltage were not applied to junction 72, the voltage induced in winding 14 would cause its upper end to become negative and draw from 39 through rectifier 36 and ground a current which would oppose the magnetomotive force produced by the positive flow of current through winding 18, and therefore cause the impedance of 18 to appear abnormally low, thus permitting an abnormally large undesired current to flow through winding 18, and reducing the difference between the desired and undesired outputs from complementing amplifier AC. Battery 13, rectifier 15 and resistor 12 function as the sneak suppressor, that is they supply a current that will cancel any small current that flows from source PP–1 through coil 18 during the time the latter has high impedance.

Figure 1:
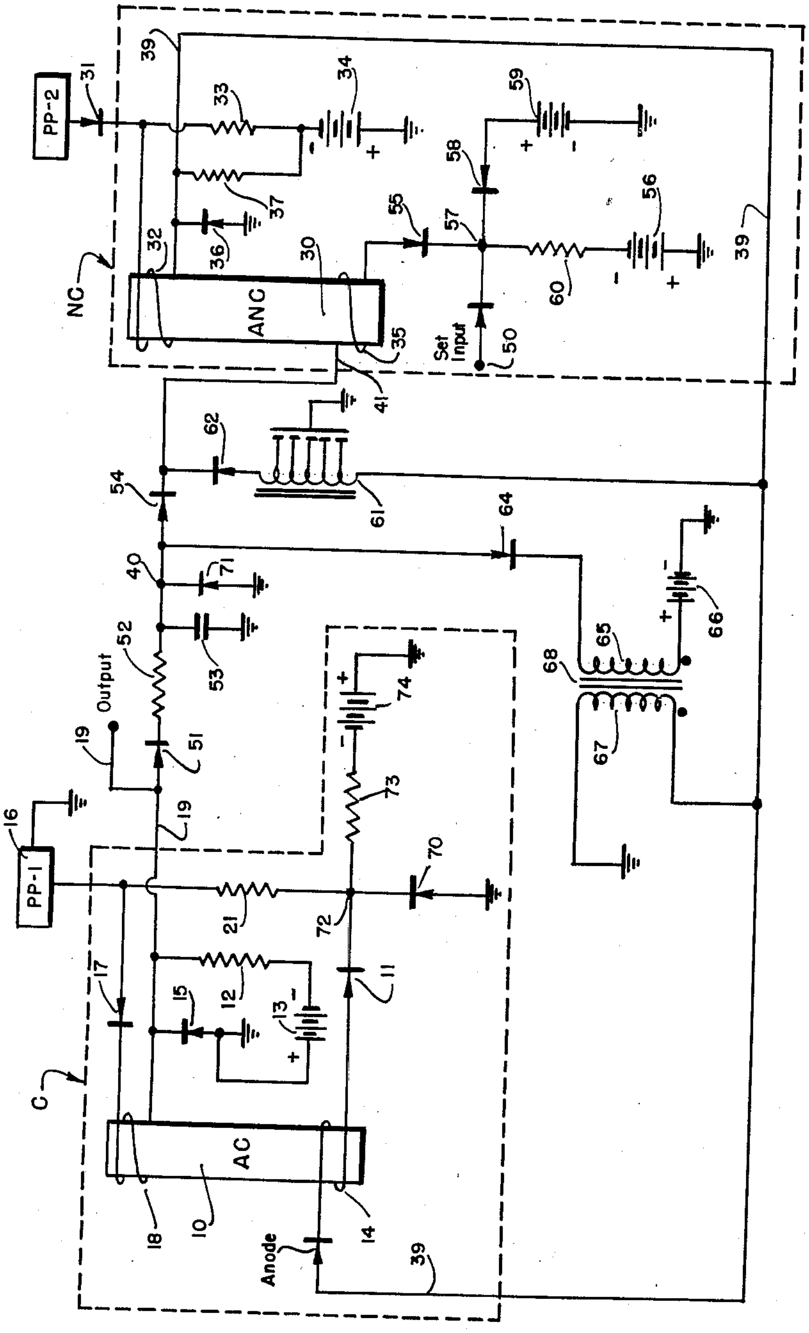
Figure 1 is a schematic circuit diagram of one form of the invention.
Figure 2:
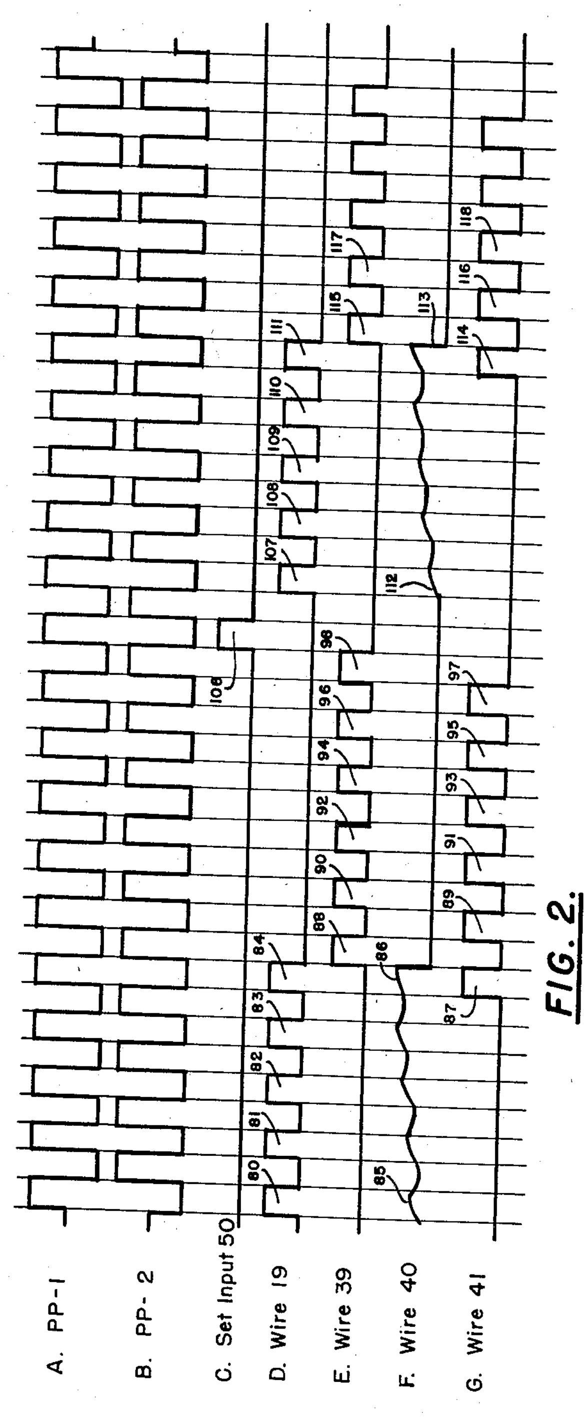
Figure 2 is a waveform timing diagram of one sequence of operation of the device of Figure 1.

It is noted that the circuit of Figure 1 is a non-resettable delay flop for the reason that if another set input signal was received at point 50 during the period of the delay, namely at any time during the period 112—113 of Figure 2F, it would have no effect on the operation of the apparatus. All such a signal would do would be to raise the potential of junction point 57 to a positive value, which would tend to prevent flow of any positive pulses through wire 41, but as no positive pulses are flowing through that wire anyhow, there would be no effect on the apparatus. However, it would be possible to modify the structure without departing from the broadest aspects of the invention so that a new pulse received during the period 112—113 would discharge the condenser and start a new train of operation.

While I have shown only one form of my invention, it is understood that numerous changes could be made without departing from the scope thereof. One change, for example, would be that different forms of magnetic amplifiers could be substituted in place of magnetic amplifiers AC and ANC. This is just one example of numerous changes that could be made without departing from the broadest aspects of my invention.

Having thus described my invention, I claim:

1. In combination, a delay flop device comprising a complementing magnetic amplifier having a source of first phase power pulses, a non-complementing magnetic amplifier having a source of second phase power pulses, a first circuit means connecting the output of said complementing amplifier to the input of said non-complementing amplifier, a second circuit means connecting the output of said non-complementing amplifier to the input of said complementing amplifier, a condenser connected to said first circuit means, a delay element connected to said first circuit means at a point between said non-complementing amplifier and said condenser connection and to said second circuit means, a third circuit means comprising a transformer connected to said first circuit means between said condenser connection and said delay element and connected to said second circuit means, said delay element feeding any pulse output from the non-complementing amplifier to its input in proper phase to produce another output pulse, means connected to said non-complementing amplifier for applying a pulse at the input thereof when said condenser is charged to a predetermined degree, and input means which stops the pulsing of the non-complementing amplifier in response to an input pulse, whereby a single input signal to the device will produce an output of a predetermined duration longer than the duration of the input signal.

2. The combination set forth in claim 1, said delay element being constructed to delay a pulse half a time period.

3. The combination set forth in claim 1, said first circuit means having a resistor electrically associated with said condenser and said first phase power pulses whereby said condenser requires a predetermined number of said first phase pulses to reach full charge, said transformer having a source of potential connected thereto whereby to determine the point of discharge of said condenser.

4. The combination set forth in claim 3, said magnetic amplifiers having cores of magnetic material with a substantially rectangular characteristic hysteresis loop.

5. A monostable device comprising in combination, a first pulse type amplifier for producing a succession of output pulses, a second pulse type amplifier, the output of each amplifier being connected to the input of the other amplifier, a feedback circuit having a delay element therein interconnecting the output and input of said second amplifier whereby application of an input to said second amplifier will cause said second amplifier to commence producing successive pulses which recycle between its output and its input, means coupled to the output of said first amplifier for applying an input to said second amplifier after said first amplifier has produced a predetermined plurality of output pulses, and means for selectively terminating said recycling of pulses between the output and input of said second amplifier.

6. The combination set forth in claim 5, said first amplifier being a complementing magnetic amplifier and said second amplifier being a non-complementing magnetic amplifier.

7. In combination, a source of regularly spaced pulses, a capacitor coupled to said source whereby successive ones of said pulses additively charge said capacitor, a non-complementing pulse type amplifier having its input coupled to said capacitor, said amplifier including means responsive to a predetermined potential level on said capacitor and operable to produce an output pulse only after a predetermined plurality of said first mentioned pulses have charged said capacitor to said predetermined potential level, first means responsive to said amplifier output pulses for discharging said capacitor, and second means responsive to said amplifier output pulse for preventing the transmission of further pulses from said source to said capacitor.

8. A delay flop comprising first and second amplifiers, first means coupling the output of said first amplifier to the input of said second amplifier, second means coupling the output of said second amplifier to the input of said first amplifier, said first means including a capacitor responsive to an output from said first amplifier for applying an input to said second amplifier after a predetermined delay time required for said capacitor to reach a predetermined charge potential level, said second amplifier being responsive to an input applied thereto whereby said second amplifier produces an output thereby to control the output state of said first amplifier via said second means, and means including a transformer responsive to an output from said second amplifier for discharging said capacitor.

9. In combination, first and second pulse type magnetic amplifiers, storage means responsive to pulse outputs from said first amplifier for applying an input to said second amplifier after said first amplifier has produced a predetermined plurality of output pulses, said second amplifier being responsive to an input applied thereto for producing an output pulse, first means responsive to said output pulse from said second amplifier for interrupting the application of output pulses from said first amplifier to said storage means, and second means responsive to said output pulse from said second amplifier for resetting said storage means preparatory to the feeding of a further plurality of output pulses from said first amplifier to said storage means.

10. In combination, a source of regularly spaced input pulses, a capacitor coupled to said source whereby successive ones of said input pulses additively charge said capacitor, a pulse type bistable device having a first stable state characterized by no output pulses and having a second stable state characterized by successive regularly spaced output pulses, said bistable device normally being in its said first stable state, means coupling said capacitor to an input of said bistable device, said bistable device being responsive to a predetermined charge potential level on said capacitor whereby said bistable device switches to its said second stable state after a predetermined plurality of said input pulses have charged said capacitor to said predetermined charge potential level, first means responsive to an output pulse from said bistable device for discharging said capacitor, second means responsive to output pulses from said bistable device for inhibiting said source of input pulses, and means for selectively reverting said bistable device to its said first stable state thereby to remove said inhibition from said source of input pulses.

11. In combination, a pulse type complementing amplifier, a pulse type non-complementing amplifier, means coupling the output of each of said amplifiers to the input of the other of said amplifiers whereby the output state of each of said amplifiers is controlled by the output state of the other of said amplifiers, and capacitor storage means responsive to output pulses from a selected one of said amplifiers for delaying application of an input to the other of said amplifiers until said selected one amplifier has produced a predetermined plurality of output pulses.

12. In combination, a first pulse type magnetic amplifier adapted to produce spaced output pulses in the absence of input pulses, a second pulse type magnetic amplifier adapted to produce spaced output pulses in response to input pulses, first means coupling the output of said first amplifier to the input of said second amplifier whereby the output state of said first amplifier controls the output state of said second amplifier, second means coupling the output of said second amplifier to the input of said first amplifier whereby the output states of said second amplifier controls the output state of said first amplifier, said first means including means for delaying the controlling effect of said first amplifier on said second amplifier for a time interval equal to the occurrence time of a preselected plurality of output pulses from said first amplifier, and external control means coupled to a selected one of said amplifiers for controlling the output state of said selected amplifier independent of the output state of the other of said amplifiers.

References Cited in the file of this patent

UNITED STATES PATENTS

| | | |
|---|---|---|
| 2,276,680 | Allen | Mar. 17, 1942 |
| 2,652,501 | Wilson | Sept. 15, 1953 |
| 2,673,337 | Avery | Mar. 23, 1954 |
| 2,721,947 | Isborn | Oct. 25, 1955 |
| 2,743,359 | Sayre | Apr. 24, 1956 |
| 2,747,109 | Montner | May 22, 1956 |
| 2,758,221 | Williams | Aug. 7, 1956 |

OTHER REFERENCES

Journal of Applied Physics, vol. 22, "A Magnetic Scaling Circuit," January 1951, pages 107–108.